US 10,986,286 B2

(12) United States Patent
Maeda et al.

(10) Patent No.: US 10,986,286 B2
(45) Date of Patent: Apr. 20, 2021

(54) IMAGE CREATION DEVICE

(71) Applicant: DENSO CORPORATION, Kariya (JP)

(72) Inventors: Yu Maeda, Nisshin (JP); Hiroaki Takeda, Nisshin (JP); Hirohiko Yanagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/704,209

(22) Filed: Dec. 5, 2019

(65) Prior Publication Data

US 2020/0112693 A1 Apr. 9, 2020

Related U.S. Application Data

(63) Continuation of application No. PCT/JP2018/021734, filed on Jun. 6, 2018.

(30) Foreign Application Priority Data

Jun. 9, 2017 (JP) .............................. JP2017-114273

(51) Int. Cl.
*H04N 5/262* (2006.01)
*H04N 7/18* (2006.01)
*H04N 13/111* (2018.01)
*B60R 1/00* (2006.01)
*H04N 5/247* (2006.01)
*H04N 5/265* (2006.01)

(52) U.S. Cl.
CPC ........... *H04N 5/2628* (2013.01); *B60R 1/002* (2013.01); *H04N 5/247* (2013.01); *H04N 5/265* (2013.01); *H04N 13/111* (2018.05); *B60R 2300/105* (2013.01); *B60R 2300/20* (2013.01); *B60R 2300/303* (2013.01); *B60R 2300/607* (2013.01)

(58) Field of Classification Search
CPC .............. B60R 1/002; B60R 2300/105; B60R 2300/607; H04N 5/2628
USPC ............................ 348/148, 159, 135, 208.14
See application file for complete search history.

(56) References Cited

U.S. PATENT DOCUMENTS

2010/0259372 A1   10/2010  Hideshiro
2012/0327238 A1*  12/2012  Satoh ................... G08G 1/167
                                                    348/148

FOREIGN PATENT DOCUMENTS

JP    2007-104373 A    4/2007
JP    2009-097685 A    5/2009
(Continued)

*Primary Examiner* — Jefferey F Harold
*Assistant Examiner* — Jean W Desir
(74) *Attorney, Agent, or Firm* — Maschoff Brennan

(57) ABSTRACT

An image creation device is provided with an image acquisition unit acquiring multiple captured images of a peripheral area, a detection unit detecting a three-dimensional object present in the peripheral area, a first conversion unit converting the multiple captured images into multiple individual overhead images to create a first conversion image by means of an overall overhead image, a second conversion unit creating a second conversion image in which an image captured from a virtual camera is converted in accordance with the conversion rule, the virtual camera being virtually arranged at a virtual position set on the vehicle such that a virtual optical axis direction faces the direction of the three-dimensional object, and a synthesis unit synthesizes the second conversion image on the first conversion image to create a synthesis image.

7 Claims, 13 Drawing Sheets

(56) References Cited

FOREIGN PATENT DOCUMENTS

| | | | |
|---|---|---|---|
| JP | 2010-109451 | A | 5/2010 |
| JP | 5165631 | B2 | 3/2013 |

\* cited by examiner

FIG.10
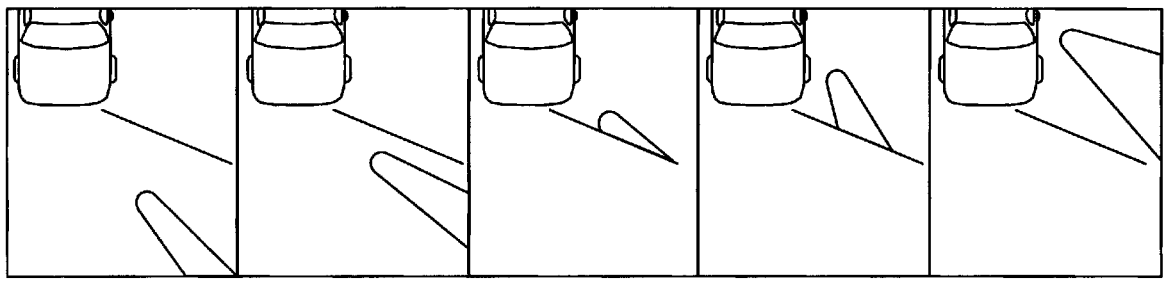
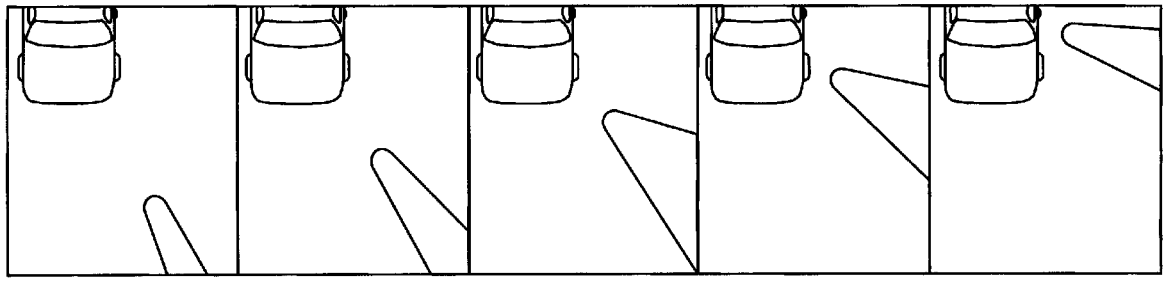

IMAGE CREATION DEVICE

This application is the U.S. bypass application of International Application No. PCT/JP2018/021734 filed Jun. 6, 2018 which designated the U.S. and claims priority to Japanese Patent Application No. 2017-114273, filed Jun. 9, 2017, the contents of which are incorporated herein by reference.

BACKGROUND OF THE INVENTION

Technical Field

The present disclosure relates to an image creation device configured to create an overhead image from a captured image of the periphery of a vehicle.

Description of the Related Art

In the field of image creation device, there are known systems which convert images of the periphery of a vehicle captured using multiple in-vehicle cameras into an overhead image (hereinafter referred to as an "overall overhead image") showing the periphery of the vehicle from above the vehicle to display the overall overhead image on a display device provided at the vehicle and provide such an image to a driver, thereby assisting safe driving.

SUMMARY

The present disclosure provides the technique of synthesizing overhead images causing less feeling of discomfort to a driver.

One aspect of the present disclosure is an image creation device mounted on a vehicle and including an image acquisition unit, a detection unit, a first conversion unit, a second conversion unit, and a synthesis unit.

Note that each reference numeral in parentheses as described in the claims indicates a correspondence with a specific section described in an embodiment described later as one aspect, and is not intended to limit the technical scope of the present disclosure.

BRIEF DESCRIPTION OF THE DRAWINGS

In the accompanying drawings:

FIG. 10 is a view of reduction in a lack of an image;

DETAILED DESCRIPTION OF THE PREFERRED EMBODIMENTS

Figure 1:
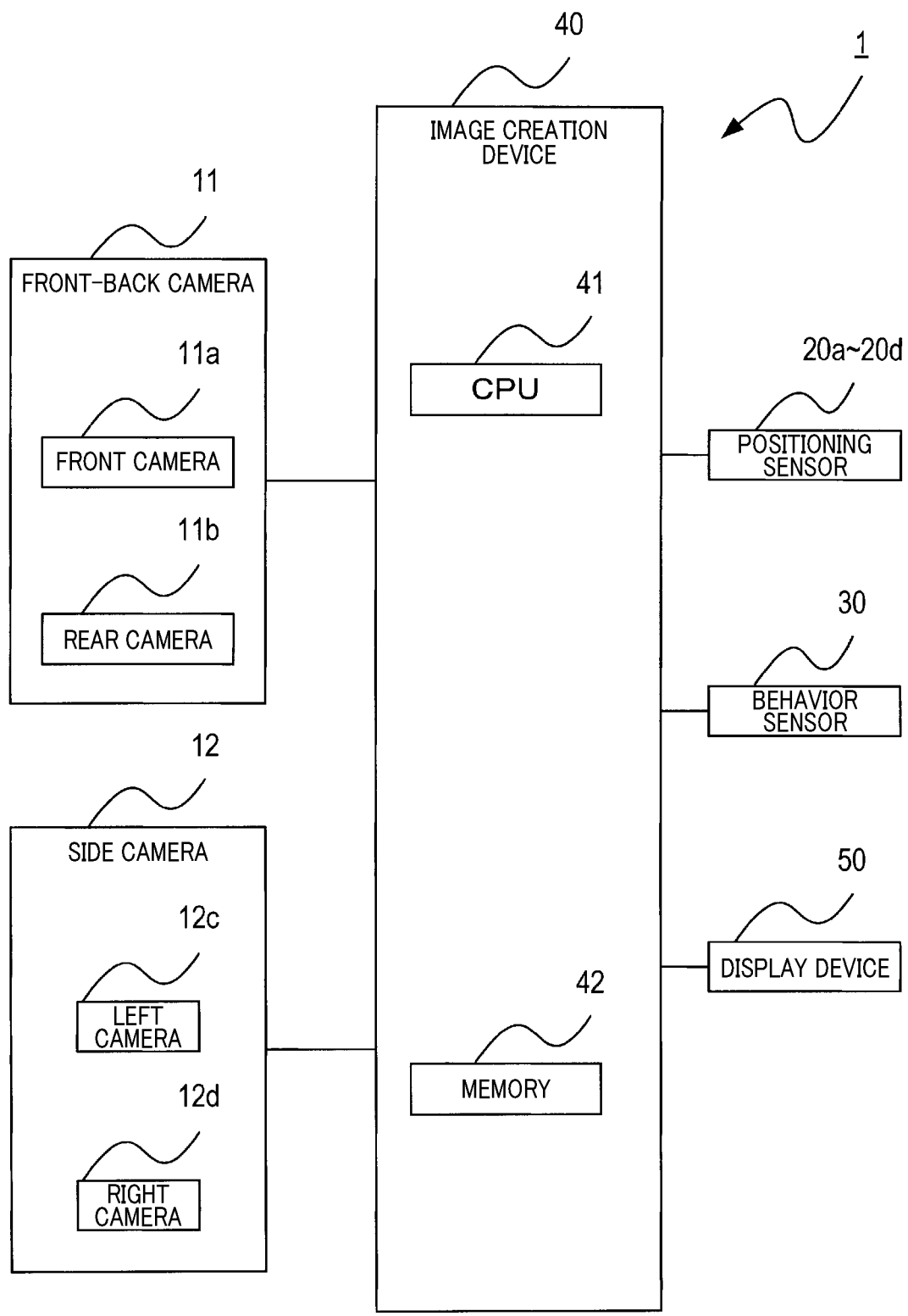
FIG. 1 is a block diagram of a configuration of an image display system.

In the above-described system, the captured images obtained by the multiple in-vehicle cameras are individually converted into overhead images (hereinafter referred to as "individual overhead images"), and the multiple individual overhead images are synthesized into the overall overhead image. When a boundary (hereinafter referred to as a "synthesis boundary") at which the individual overhead images contact each other is, in the overall overhead image, present to cross a portion where a three-dimensional object is displayed, the image becomes discontinuous, and a lack of the portion where the three-dimensional object is displayed is caused. Moreover, a position at which a shift angle from an optical axis direction of the in-vehicle camera is greater results in greater image distortion in the case of converting the captured images into the overall overhead image. For this reason, an image of the three-dimensional object shown in the overall overhead image is often in an unnatural shape.

In this respect, a patent literature discloses the technique of storing an image (hereinafter referred to as a "three-dimensional object image") of a three-dimensional object in advance and synthesizing, in a case where the three-dimensional object has been sensed, the three-dimensional object image with a position corresponding to the position of the sensed three-dimensional object on an overall overhead image. In this case, a lack of an image upon synthesis and image distortion upon conversion are not caused for the three-dimensional object, and therefore, unnaturalness as described above is reduced.

However, as a result of detailed study by the inventors, there is a probability that in the method described in Patent Literature 1, the actual three-dimensional object and the three-dimensional object indicated by the synthesized three-dimensional object image do not match each other in terms of a shape, a color, etc. A problem has been found, in which when such an overall overhead image is displayed, such a displayed indication provides a feeling of discomfort to a driver.

In light of the above-described circumstances, the present disclosure provides an image creation device mounted on a vehicle and including an image acquisition unit, a detection unit, a first conversion unit, a second conversion unit, and a synthesis unit. The image acquisition unit acquires multiple captured images as images captured by multiple image capturing devices configured to capture an image of a peripheral area as a predetermined area of the periphery of the vehicle. The detection unit detects a three-dimensional object present in the peripheral area. The first conversion unit converts the multiple captured images acquired by the image acquisition unit into multiple individual overhead images indicating the vehicle from the point of view overlooking the vehicle according to a preset conversion rule, thereby creating a first conversion image by means of an overall overhead image obtained by synthesis of the multiple individual overhead images. The second conversion unit creates a second conversion image in which an image captured from a virtual camera is converted in accordance with the conversion rule. The virtual camera is virtually arranged at a virtual position set on the vehicle such that a virtual optical axis direction faces the direction of the three-dimensional object. The synthesis unit synthesizes the second conversion image on the first conversion image to create a synthesis image.

According to such a configuration, the second conversion image as an image of the three-dimensional object in the synthesis image is an image created based on the captured images. Thus, the three-dimensional object present at the periphery of the vehicle and the three-dimensional object present in the synthesized image are the same as each other in terms of shape, color, etc.

Moreover, the optical axis direction of the virtual camera is arranged to face the direction of the three-dimensional object. Thus, when the three-dimensional object is converted into the overhead image, distortion of the image of the three-dimensional object due to a large deviation from the optical axis direction of the camera can be reduced.

Further, the synthesis image is created by synthesis of the second conversion image on the first conversion image. Thus, missing parts in the displayed image of the three-dimensional object can be reduced. That is, when a synthesis boundary is, in the first conversion image, present to cross a portion where the three-dimensional object is displayed, the image becomes discontinuous, and the lack of the portion where the three-dimensional object is displayed is caused. However, the second conversion image as the image of the three-dimensional object is synthesized on the first conversion image, and therefore, missing parts in the displayed image of the three-dimensional object can be reduced. With these configurations, an overall overhead image causing less discomfort to a driver can be synthesized.

Hereinafter, an embodiment of the present disclosure will be described with reference to the drawings.

1. Embodiment

[Configuration]

An image display system 1 illustrated in FIG. 1 is mounted on a vehicle, and includes a front-back camera 11, a side camera 12, multiple positioning sensors 20*a* to 20*d*, a behavior sensor 30, an image creation device 40, and a display device 50. Note that a vehicle including these configurations will be hereinafter referred to as a "subject vehicle."

The front-back camera 11 and the side camera 12 are image capturing devices configured to capture images of the periphery of the subject vehicle. Basic configurations of the front-back camera 11 and the side camera 12 are similar to each other. Moreover, the front-back camera 11 and the side camera 12 are placed at such positions that image capturing areas thereof partially overlap with each other.

The front-back camera 11 indicates a front camera 11*a* configured to capture an image in front of the subject vehicle and a rear camera 11*b* configured to capture an image to the rear of the subject vehicle.

Figure 2:
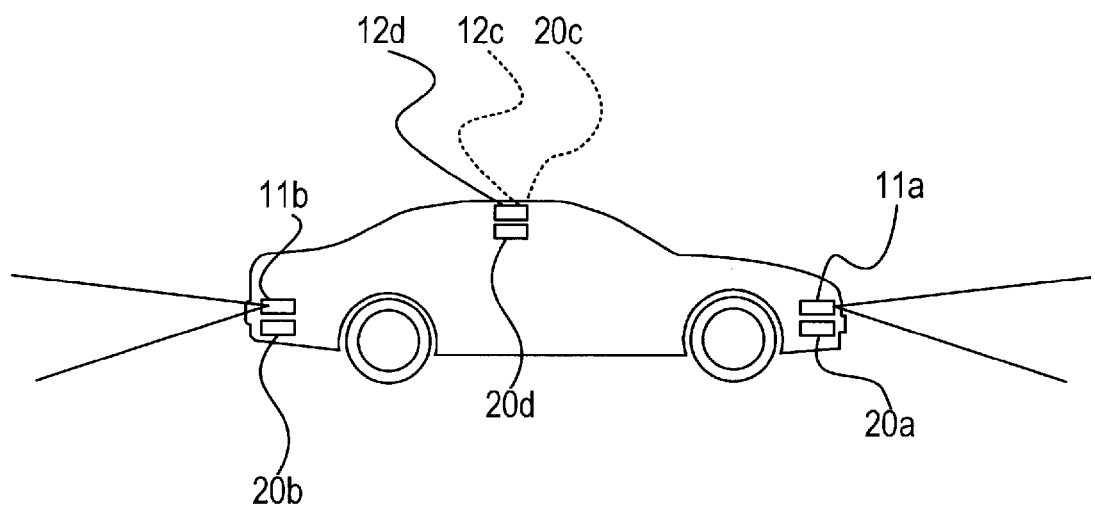
FIG. 2 is a view of an example of a position at which each configuration is mounted on a subject vehicle.

As illustrated in FIG. 2, the front camera 11*a* and the rear camera 11*b* are each mounted on a front bumper and a rear bumper of the subject vehicle such that optical axis directions thereof are coincident with a forward movement direction and a backward movement direction of the subject vehicle. Moreover, the front camera 11*a* and the rear camera 11*b* each capture images within an angular range of about 180° in the front and back of the subject vehicle in terms of a view angle, for example.

On the other hand, the side camera 12 indicates a left camera 12*c* configured to capture an image of the left side of the subject vehicle and a right camera 12*d* configured to capture an image of the right side of the subject vehicle.

As illustrated in FIG. 2, the left camera 12*c* and the right camera 12*d* are each mounted in the vicinity of the center of a vehicle body of the subject vehicle in a front-to-back direction to face a direction of 90° on the left side and a direction of 90° on the right side in the forward movement direction of the subject vehicle. Moreover, the left camera 12*c* and the right camera 12*d* each capture images within a range of about 180° on the left side and the right side of the subject vehicle in terms of a view angle, for example.

The positioning sensors 20*a* to 20*d* each detect a three-dimensional object present within the image capturing areas of the front-back camera 11 and the side camera 12 corresponding to the positioning sensors 20*a* to 20*d*, thereby measuring the position of the three-dimensional object. The three-dimensional object described herein indicates a target having such a height that the subject vehicle cannot move over the target, for example. Each of the positioning sensors 20*a* to 20*d* is placed in the vicinity of the front-back camera 11 or the side camera 12 corresponding to such a positioning sensor. The positioning sensors 20*a* to 20*d* described herein are well-known sensors such as in-vehicle radars.

The behavior sensor 30 has various types of equipment configured to detect information regarding, e.g., behavior of the subject vehicle and operation influencing the behavior of the subject vehicle. A target for detection by the behavior sensor 30 includes, for example, operation amounts of an accelerator pedal and a brake pedal, a steering angle, a vehicle speed, a vehicle acceleration, and the rotation speed of a wheel.

The image creation device 40 creates a synthetic image according to output from the front-back camera 11, the side camera 12, the positioning sensors 20*a* to 20*d*, and the behavior sensor 30.

The image creation device 40 mainly includes a well-known microcomputer having a CPU 41 and a semiconductor memory (hereinafter referred to as "memory 42") such as a RAM, a ROM, and a flash memory. Various functions of the image creation device 40 are implemented in such a manner that the CPU 41 executes programs stored in a non-transitory tangible recording medium. In this example, the memory 42 corresponds to the non-transitory tangible recording medium storing the programs. Moreover, the program is executed, and in this manner, a method corresponding to such a program is executed. Note that the number of microcomputers forming the image creation device 40 may be one or more. Further, the memory 42 stores a synthetic image created by execution of each program by the CPU 41.

The image creation device 40 is implemented in such a manner that the CPU 41 executes the program. However, such a technique is not limited to software, and some or all of elements of the image creation device 40 may be implemented using one or more types of hardware. For example, in a case where the above-described functions are implemented by an electronic circuit as hardware, such an electronic circuit may be implemented by a digital circuit including many logical circuits, an analog circuit, or a combination thereof.

The display device 50 is mounted at such a position that a driver can view a displayed indication from a driver seat of the subject vehicle, and acquires the synthetic image from the image creation device 40 and displays such an image. For example, the display device 50 is a well-known device such as a display placed on an instrument panel of the subject vehicle or a display of a car navigation system mounted on the subject vehicle.

[Processing]

<Image Display Processing>

Figure 3:
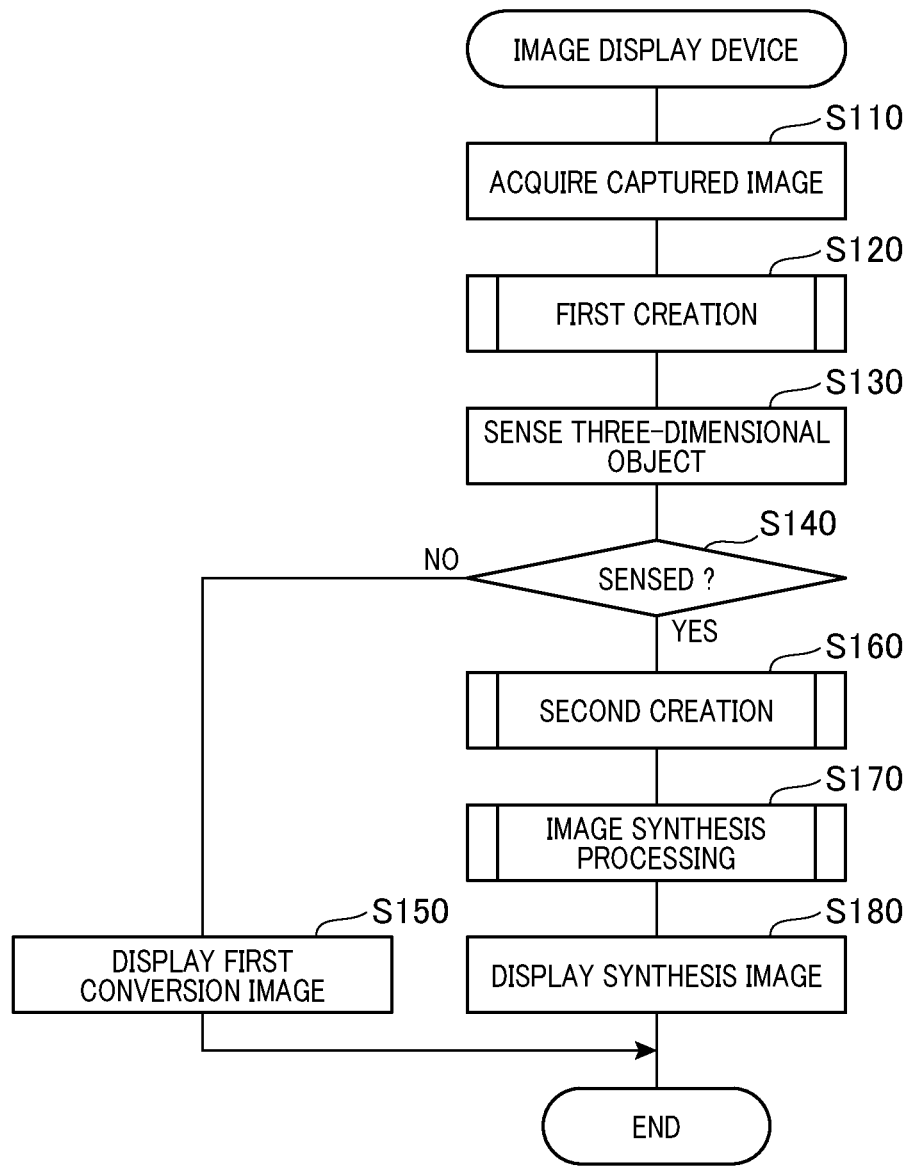
FIG. 3 is a flowchart of image display processing.

Next, image display processing executed by the image creation device 40 will be described with reference to a flowchart of FIG. 3. The image display processing is repeatedly executed in a case where a shift lever is set at a position of "R." "R" described herein is a reverse range, and is a region where the shift lever is positioned when the vehicle moves backward.

At S110, the image creation device 40 acquires, from each image capturing device, each captured image from the front camera 11a, the rear camera 11b, the left camera 12c, and the right camera 12d.

At S120, the image creation device 40 performs first creation processing for creating a first conversion image based on the captured images acquired at S110.

At S130, the image creation device 40 senses a three-dimensional object present in a peripheral area by means of the positioning sensors 20a to 20d. The peripheral area described herein indicates an area around the subject vehicle, the area including at least an area to be converted into the first conversion image 105. Sensing of the three-dimensional object by means of the positioning sensors 20a to 20d is performed by a well-known method.

At S140, the image creation device 40 determines whether or not a three-dimensional object was sensed in S130.

In a case where no three-dimensional object has been sensed, the image creation device 40 transitions the processing to S150.

On the other hand, in a case where the three-dimensional object has been sensed, the image creation device 40 transitions the processing to S160.

At S150, the image creation device 40 displays the first conversion image 105 created by the first creation processing at S120 on the display device 50, and ends the processing.

At S160, the image creation device 40 performs second creation processing for creating a second conversion image 106 based on the first conversion image 105 and three-dimensional object sensing results detected by the positioning sensors.

At S170, the image creation device 40 performs image synthesis processing for synthesizing the first conversion image 105 created by the first creation processing at S120 and the second conversion image 106 created by the second creation processing at S160 to create the synthetic image.

At S180, the image creation device 40 displays the synthetic image created at S170 on the display device 50.

Note that the processing at S110 corresponds to processing as an image acquisition unit, and the processing at S120 corresponds to processing as a first conversion unit. Moreover, the processing at S130 corresponds to processing as a detection unit, the processing at S160 corresponds to processing as a second conversion unit, and the processing at S170 corresponds to processing as a synthetic unit.

<First Creation Processing>

Figure 4:
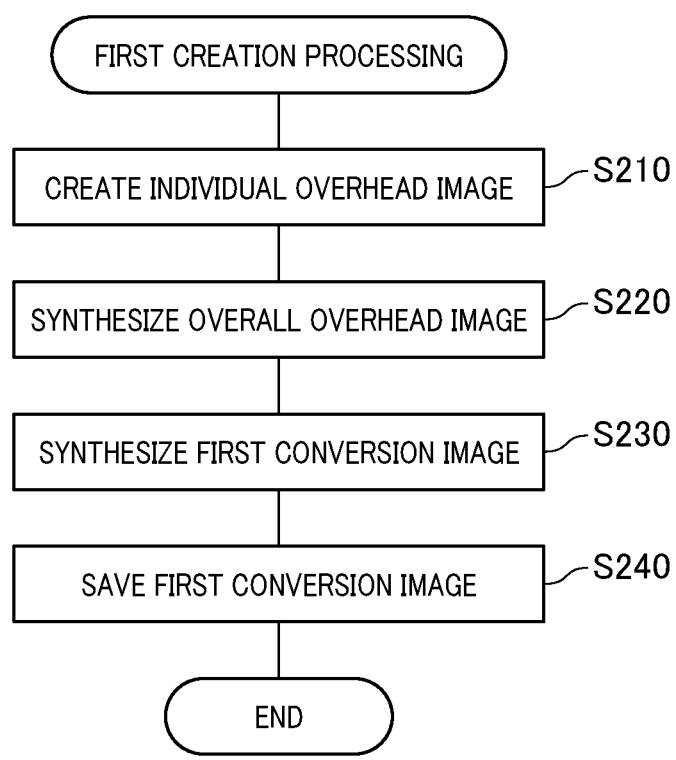
FIG. 4 is a flowchart of first creation processing.

Next, the first creation processing executed by the image creation device 40 at S120 will be described with reference to a flowchart of FIG. 4 and an explanatory view of FIG. 5.

At S210, the image creation device 40 creates an individual overhead image. The individual overhead image described herein indicates a front-back overhead image 101 and a side overhead image 102. As illustrated in FIG. 5, the front-back overhead image 101 includes a front overhead image 101a and a back overhead image 101b. The front overhead image 101a is an overhead image obtained by conversion of the captured image obtained by the front camera 11a. Conversion from the captured image into the overhead image as described herein is conversion according to a predetermined rule (hereinafter referred to as a "conversion rule"). The conversion rule described herein is a rule indicating coordinate conversion for projecting the captured image onto a road surface on which the vehicle is present to convert the captured image into the overhead image.

The back overhead image 101b is an overhead image obtained by conversion of the captured image obtained by the rear camera 11b according to the conversion rule.

Moreover, the side overhead image 102 includes a left overhead image 102c and a right overhead image 102d. The left overhead image 102c is an overhead image obtained by conversion of the captured image obtained by the left camera 12c according to the conversion rule. The right overhead image 102d is an image obtained by conversion of the captured image obtained by the right camera 12d according to the conversion rule. Further, the front-back overhead image 101 is, for example, an image indicating an area of 5 m ahead of a front end of the subject vehicle and behind a back end of the subject vehicle and an area of 5 m rightward and leftward of the center of subject vehicle in a vehicle width direction. The side overhead image 102 is, for example, an image indicating an area of 5 m from a side surface of the subject vehicle in the vehicle width direction and an area of 5 m from the center of the subject vehicle in the front-to-back direction in the front-to-back direction of the subject vehicle.

At S220, the image creation device 40 assigns the front overhead image 101a, the back overhead image 101b, the left overhead image 102c, and the right overhead image 102d to set areas 103a to 103d as areas set in advance, thereby synthesizing these images into an overall overhead image 104.

The set areas 103a to 103d described herein are set not to overlap with each other. For the set areas 103a to 103d, angular ranges determined in advance for directions about the center position of the subject vehicle in the overhead image are set. For example, the front region 103a is set to have an angular range of ±60° in the forward movement direction of the subject vehicle. Moreover, for the back region 103b as a set area in the back of the subject vehicle, an angular range of ±70° in the backward movement direction of the subject vehicle is set. Further, for the right region 103d and the left region 103c as right and left set areas, e.g., an angular range of ±25° in a direction inclined 10° in the forward movement direction of the subject vehicle with respect to the vehicle width direction of the subject vehicle.

Synthesis of each overhead image is performed as follows. That is, a portion of the front overhead image 101a corresponding to the front region 103a is cut off, and the cut portion is attached to the front region 103a. Similarly for the back overhead image 101b, the left overhead image 102c, and the right overhead image 102d, portions corresponding to the back region 103b, the left region 103c, and the right region 103d are cut off, and the cut portions are each attached to the regions. The overall overhead image 104 is synthesized by such cutoff and attachment. Note that as illustrated in FIG. 5, regions 104a to 104d forming the overall overhead image 104 each correspond to the front region 103a, the back region 103b, the left region 103c, and the right region 103d.

Figure 5:
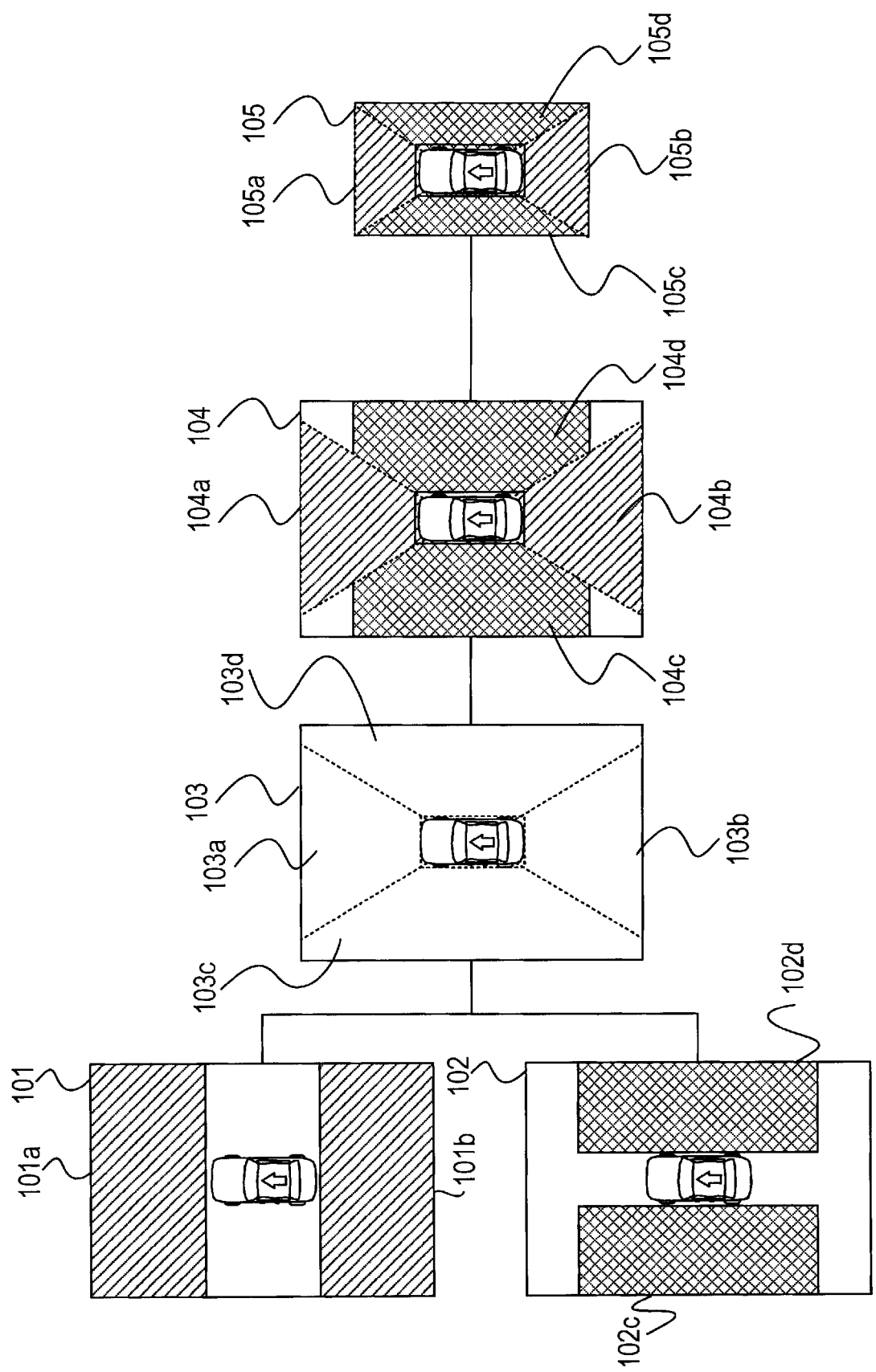
FIG. 5 is a view of an image created at each step of the first creation processing.

At S230, the image creation device 40 synthesizes the first conversion image 105 as an image of an area displayed on the display device 50 in the overall overhead image 104 as illustrated in FIG. 5. Regions 105a to 105d forming the first conversion image 105 each correspond to the regions 104a to 104d forming the overhead image. The area displayed on the display device 50 as described herein may be, for example, an area of 3 m rightward and leftward of the center of the subject vehicle and an area of 2 m ahead of the front end of the vehicle and behind the back end of the vehicle.

At S240, the image creation device 40 associates the first conversion image 105 synthesized at S230 with the point of time of capturing the image by the image capturing device, and saves such an association.

Note that the processing at S240 corresponds to processing as a history storing unit.

<Second Creation Processing>

Figure 6:
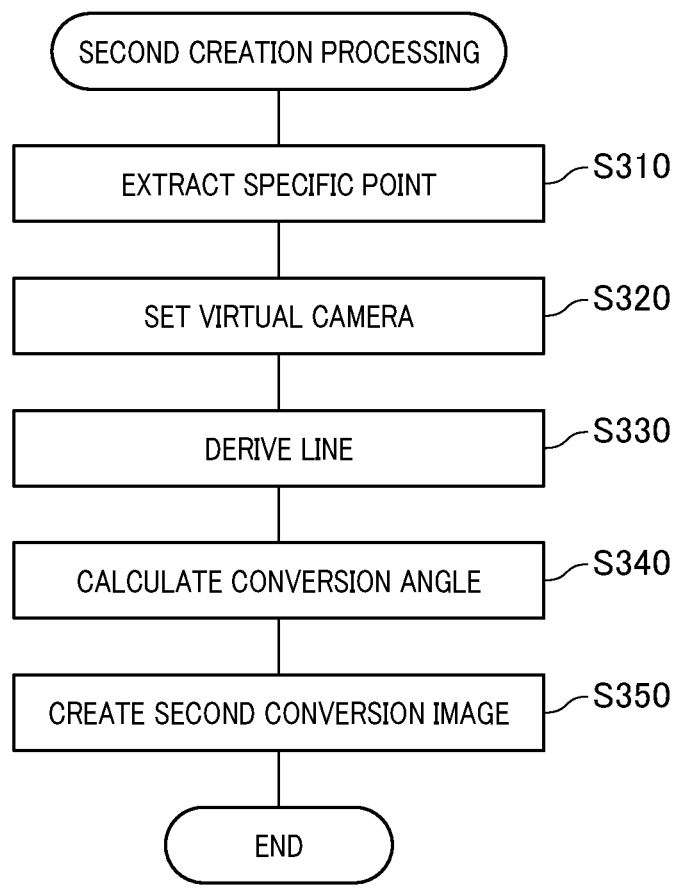
FIG. 6 is a flowchart of second creation processing.

Next, the second creation processing executed by the image creation device 40 at S160 will be described with reference to a flowchart of FIG. 6, an explanatory view of FIG. 7, and an explanatory view of FIG. 8.

At S310, the image creation device 40 extracts a specific point p from the first conversion image 105 created by the first creation processing. The specific point p described herein indicates at least one point indicating such a position in the first conversion image 105 that the three-dimensional object has been sensed by the positioning sensors 20a to 20d.

At S320, the image creation device 40 sets the position and direction of a virtual camera 13e.

A position determined according to a predetermined rule in the first conversion image 105 is set as the position of the virtual camera 13e. The predetermined rule described herein is, for example, a rule for setting a position along the outer periphery of the subject vehicle. Specifically, as illustrated in FIG. 7, the position of a left side mirror of the subject vehicle is set as the position of the virtual camera 13e.

The virtual camera 13e is set such that an optical axis direction thereof overlaps with one of the extracted specific points p.

At S330, the image creation device 40 obtains a target line La and a conversion line Lb derived for each specific point p. The target line La described herein indicates a line connecting the position of a target camera as a camera having captured the image of the three-dimensional object and the specific point p in the first conversion image 105. For example, in a case where the front camera 11a is the target camera, a line connecting the position of the front camera 11a and the specific point p is taken as the target line La as illustrated in FIG. 7. Similarly, in a case where the left camera 12c is the target camera, a line connecting the position of the left camera 12c and the specific point p is taken as the target line La as illustrated in FIG. 8.

Moreover, the conversion line Lb indicates a line connecting the position of the virtual camera 13e and the specific point p.

At S340, the image creation device 40 calculates a conversion angle α for each specific point p. The conversion angle α described herein indicates, for each specific point p, a vertical angle of an angle between the target line La and the conversion line Lb in such a position relationship that the target line La and the conversion line Lb sandwich the subject vehicle.

That is, the conversion angle α indicates an angle between the direction of the specific point p with respect to the target camera as the camera having captured the image of the three-dimensional object and the direction of the specific point p with respect to the virtual camera 13e.

The conversion angle α is calculated based on a virtual angle θi and a target camera angle θa. The virtual angle θi described herein indicates the direction of the specific point p as viewed from the position of the virtual camera 13e, taking a direction of 90° on the right side with respect to the forward movement direction of the subject vehicle as 0°. Moreover, the target camera angle θa indicates the direction of the specific point p as viewed from the position of the target camera. In other words, the target camera angle θa indicates the direction of the specific point p as viewed from the position of the target camera when a direction of 90° on the right side with respect to the forward movement direction of the subject vehicle is taken as 0°.

Figure 7:
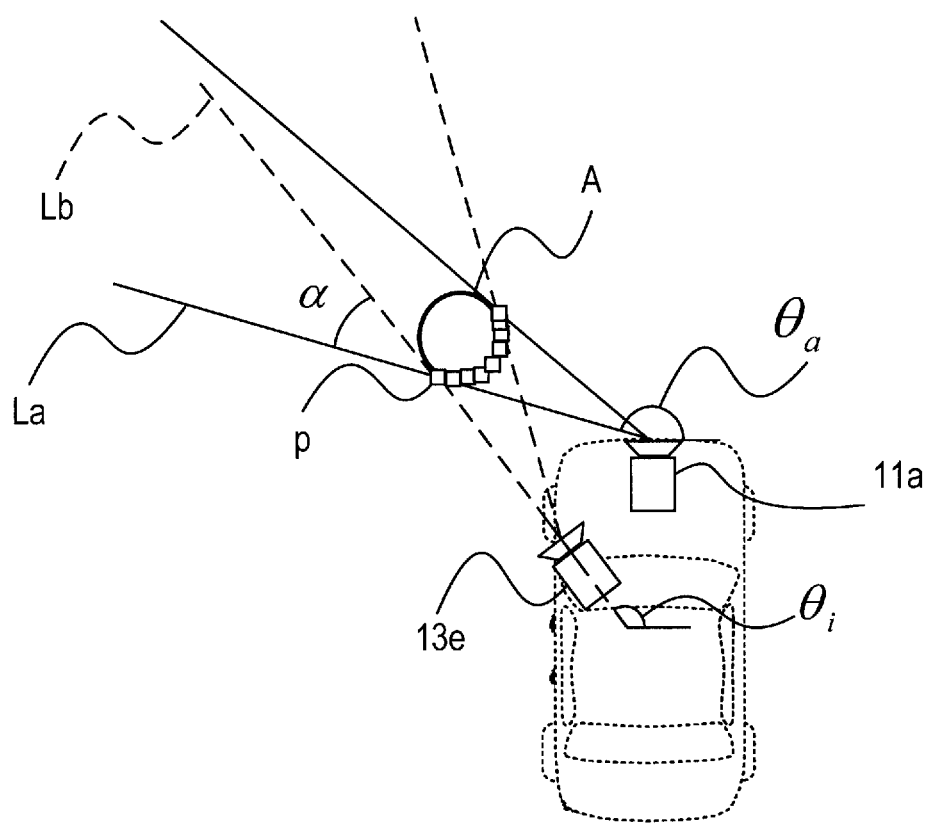
FIG. 7 is a view of conversion from an overhead image of a front camera into a virtual overhead image.

That is, in a case where the target camera is the front camera 11a, the virtual angle θi and the target camera angle θa are provided as illustrated in FIG. 7.

Figure 8:
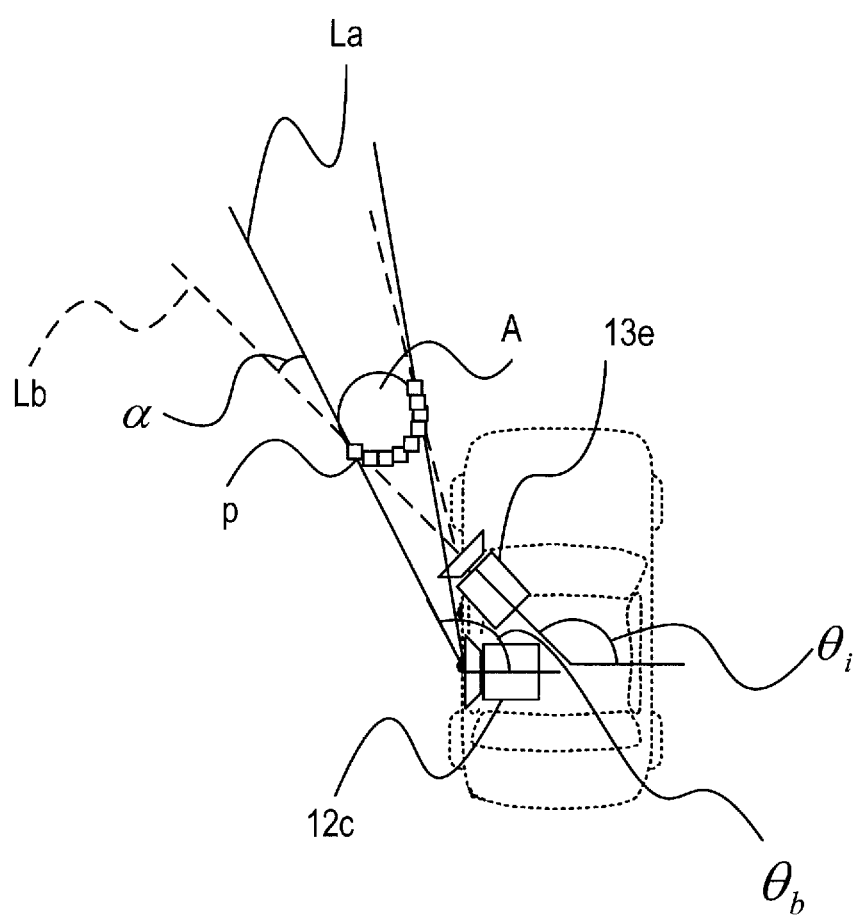
FIG. 8 is a view of conversion from an overhead image of a left camera into a virtual overhead image.

Similarly, in a case where the target camera is the left camera 12c, the virtual angle θi and the target camera angle θa are provided as illustrated in FIG. 8.

The conversion angle α is, using the virtual angle θi and the target camera angle θa, represented by Expression (1) below.

[Expression 1]

$$\alpha = \theta_i - \theta_a \quad (1)$$

Note that in a case where the target camera is the rear camera 11b or the right camera 12d, the conversion angle α is also similarly calculated.

At S350, the image creation device 40 creates the second conversion image 106.

The second conversion image 106 indicates an image obtained by movement of a three-dimensional object area of the first conversion image 105 by coordinate conversion. The three-dimensional object area described herein is an area where the three-dimensional object is shown in the first conversion image 105. That is, the three-dimensional object area indicates an area positioned on the opposite side of the specific point p from the position of the target camera of the subject vehicle in the first conversion image 105. That is, in the captured image obtained by the target camera, an image beyond the position of the three-dimensional object in a depth direction as viewed from the target camera is not obtained, and therefore, the entirety of the area on the opposite side of the specific point p from the subject vehicle in the first conversion image 105 is converted as the three-dimensional object.

Moreover, movement of the three-dimensional object area by coordinate conversion is performed as follows. That is, such movement is performed in such a manner that pixels belonging to the target line La for each specific point p are rotated about the specific point p by the conversion angle α calculated at S340 to overlap with the conversion line Lb.

In a case where the same three-dimensional object is on both of the front-back overhead image 101 and the side overhead image 102, the second conversion image 106 may be created based on either one of the images. The image as a base for creation of the second creation image as described herein may be selected based on the degree of the conversion angle α. That is, the average of the conversion angle α calculated for each specific point p may be compared between the individual overhead images, and the second creation image may be created based on the individual overhead image with a smaller average of the conversion angle α.

Note that the processing at S340 corresponds to processing as an angle calculation unit, and the processing at S350 corresponds to processing as a conversion execution unit.

<Image Synthesis Processing>

Figure 9:
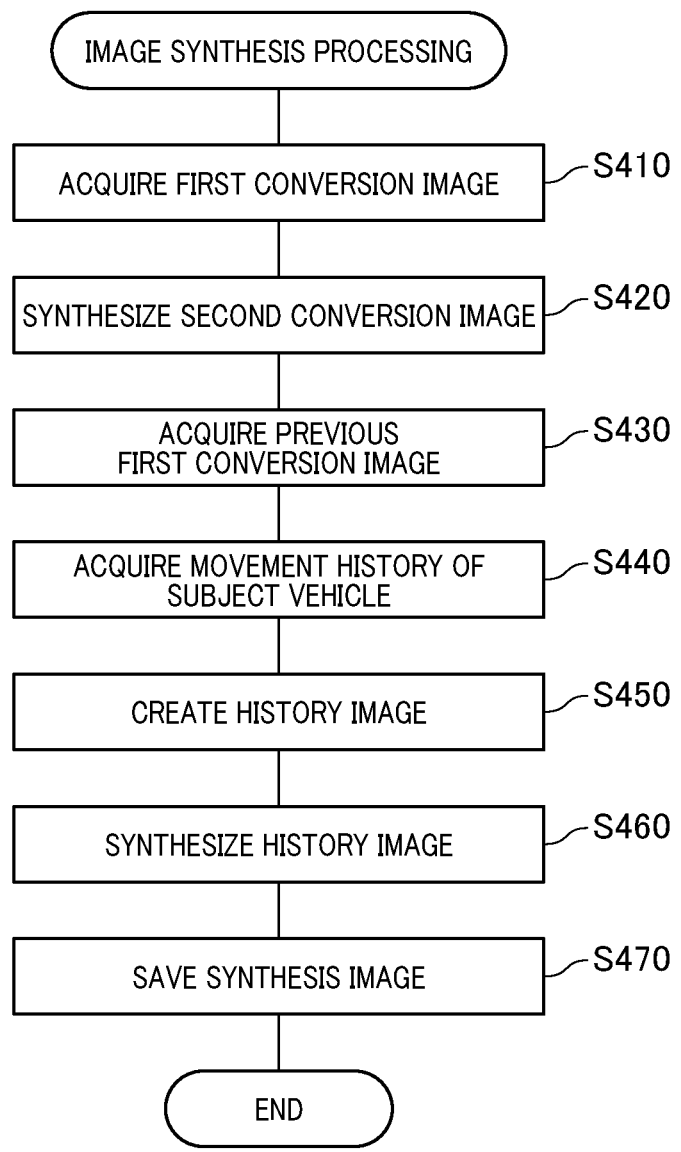
FIG. 9 is a flowchart of image synthesis processing.

Next, details of the image synthesis processing executed by the image creation device 40 at S170 will be described with reference to a flowchart of FIG. 9.

At S410, the image creation device 40 acquires the first conversion image 105 created by the first creation processing.

At S420, the image creation device 40 synthesizes the second conversion image 106 created by the second creation processing with the first conversion image 105 acquired at S410. Synthesis of the second conversion image 106 as described herein is performed in such a manner that a portion of the first conversion image 105 corresponding to the second conversion image 106 is replaced with the second conversion image 106.

At S430, the image creation device 40 acquires the previous first conversion image 105 saved in the memory 42. That is, the first conversion image 105 saved at a preset point of time among the first conversion images 105 saved in the memory 42 is acquired. The preset point of time as described herein may be, for example, set to the point of time of acquiring the first conversion image 105 saved in the memory 42 before the current image display processing.

At S440, the image creation device 40 acquires a movement history after the point of time of storing the first conversion image 105 acquired at S430. The movement history described herein indicates the movement distance and direction of the subject vehicle derived from the behavior of the subject vehicle measured by the behavior sensor 30 of the subject vehicle.

At S450, the image creation device 40 creates a history image 107. The history image 107 described herein is an image obtained in such a manner that the first conversion image 105 acquired at S430 is coordinate-converted such that a displayed indication in the image is moved in a direction opposite to the movement distance and direction of the subject vehicle indicated by the movement history acquired at S440. That is, the history image 107 is an image corresponding to the current first conversion image 105 created based on the previous first conversion image 105.

Figure 13:
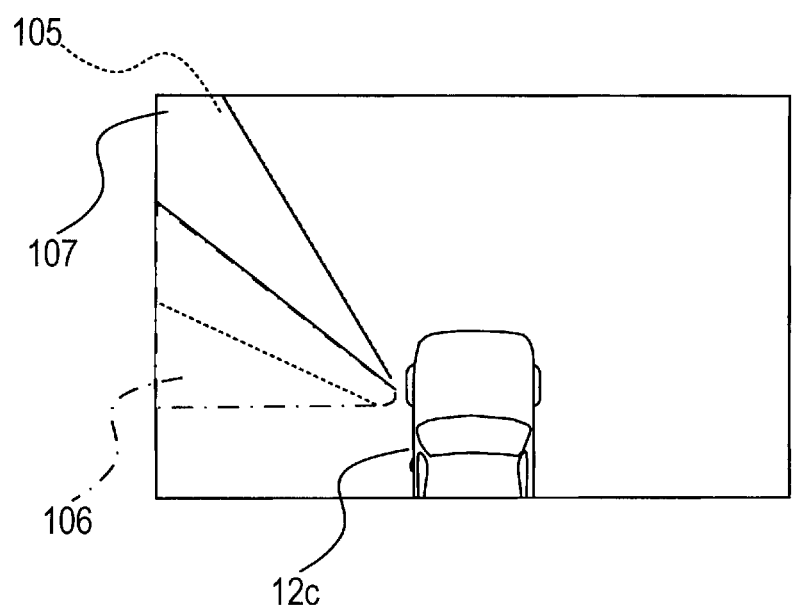
FIG. 13 is a view of a history image of a three-dimensional object area included in a first conversion image as a substitution.

At S460, the image creation device 40 replaces, with the history image 107 created at S450, an area of the three-dimensional object area of the first conversion image 105 other than the area replaced with the second conversion image 106 as illustrated in FIG. 13 in the image synthesized at S420. That is, the history image 107 is used as a substitute for an area not replaced with the second conversion image 106 in the three-dimensional object area of the current first conversion image 105.

At S470, the image creation device 40 saves the image synthesized at S460.

The processing at S440 corresponds to processing as a behavior acquisition unit, and the processing at S450 corresponds to processing as a history image creation unit.

[Advantageous Effects]

According to the first embodiment described above in detail, the following advantageous effects are provided.

(1a) In the present embodiment, a feeling of discomfort of the driver due to the displayed overhead image can be reduced. That is, in the present embodiment, the captured image obtained by the image capturing camera is converted into the first conversion image 105 converted into the overhead image. Then, the second conversion image 106 obtained in such a manner that the image of the virtual camera 13e set such that the optical axis direction thereof faces the direction of the three-dimensional object is converted into the overhead image is created based on the captured image. Then, the second conversion image 106 is synthesized with the first conversion image 105.

With this configuration, the shape and color of the three-dimensional object displayed on the synthesized image match those of the three-dimensional object present at the periphery of the subject vehicle.

(1b) Moreover, the second conversion image 106 is set such that an optical axis direction thereof faces the direction of the three-dimensional object, and therefore, when the displayed indication of the three-dimensional object in the captured image is converted into the overhead image, image distortion due to an increase in a shift angle from the optical axis direction can be reduced.

Thus, the feeling of discomfort of the driver can be reduced.

(1c) According to the present embodiment, missing parts in the displayed image of the three-dimensional object due to synthesis of the selected individual overhead image on the displayed indication of the three-dimensional object in the displayed image can be reduced. That is, missing parts in the displayed image of the three-dimensional object is caused because the selected individual overhead image is synthesized on the displayed indication of the three-dimensional object as part of the individual overhead image not selected in the first conversion image 105. In the present embodiment, the second conversion image 106 indicating the three-dimensional object is further synthesized on the first conversion image 105 including the selected individual overhead image. With this configuration, the missing parts in the displayed image is not caused as long as the three-dimensional object area in the first conversion image 105 does not project from the second conversion image 106.

Thus, the lack of the displayed indication of the three-dimensional object in the synthesized image can be reduced.

For example, a case where the three-dimensional object is present on the right back side of the subject vehicle as illustrated in FIG. 10 and the subject vehicle moves backward may be assumed. In this case, as the subject vehicle moves backward, a relative position relationship between the subject vehicle and the three-dimensional object changes.

In this case, in a typical overhead image, different cameras configured to capture images as a base for individual overhead images on one and the other side with respect to a synthesis boundary in an overall overhead image are used as illustrated on the upper side of FIG. 10. For this reason, in a case where one individual overhead image is selected and displayed in a converted image, when a three-dimensional object is present in the unselected individual overhead image, a displayed indication of such a three-dimensional object is synthesized with the selected individual overhead image, leading to a lack of the displayed indication of the three-dimensional object.

On the other hand, according to the present embodiment, the second conversion image 106 as an image showing the three-dimensional object is created, and a portion of the first conversion image 105 corresponding to the second conversion image 106 is replaced with the second conversion image 106. In this manner, the synthesis image illustrated on the lower side of FIG. 10 is created.

With this configuration, the lack of the displayed indication of the three-dimensional object due to synthesis of the selected individual overhead image on the displayed indication of the three-dimensional object can be reduced. Thus, the feeling of discomfort of the driver due to the lack of the displayed indication of the three-dimensional object can be reduced.

2. Other Embodiments

The embodiment of the present disclosure has been described above, but the present disclosure is not limited to the above-described embodiment. Various modifications can be made.

(2a) In the above-described embodiment, rotation of the three-dimensional object area by coordinate conversion performed in the second creation processing is performed in such a manner that the pixels belonging to the target line La for each specific point p are rotated by the conversion angle α calculated at S340 to overlap with the conversion line Lb. Rotation of the three-dimensional object area by coordinate conversion as described herein indicates rotation performed for creating the second conversion image 106.

However, the method for rotating the three-dimensional object area by coordinate conversion is not limited to above.

Figure 11:
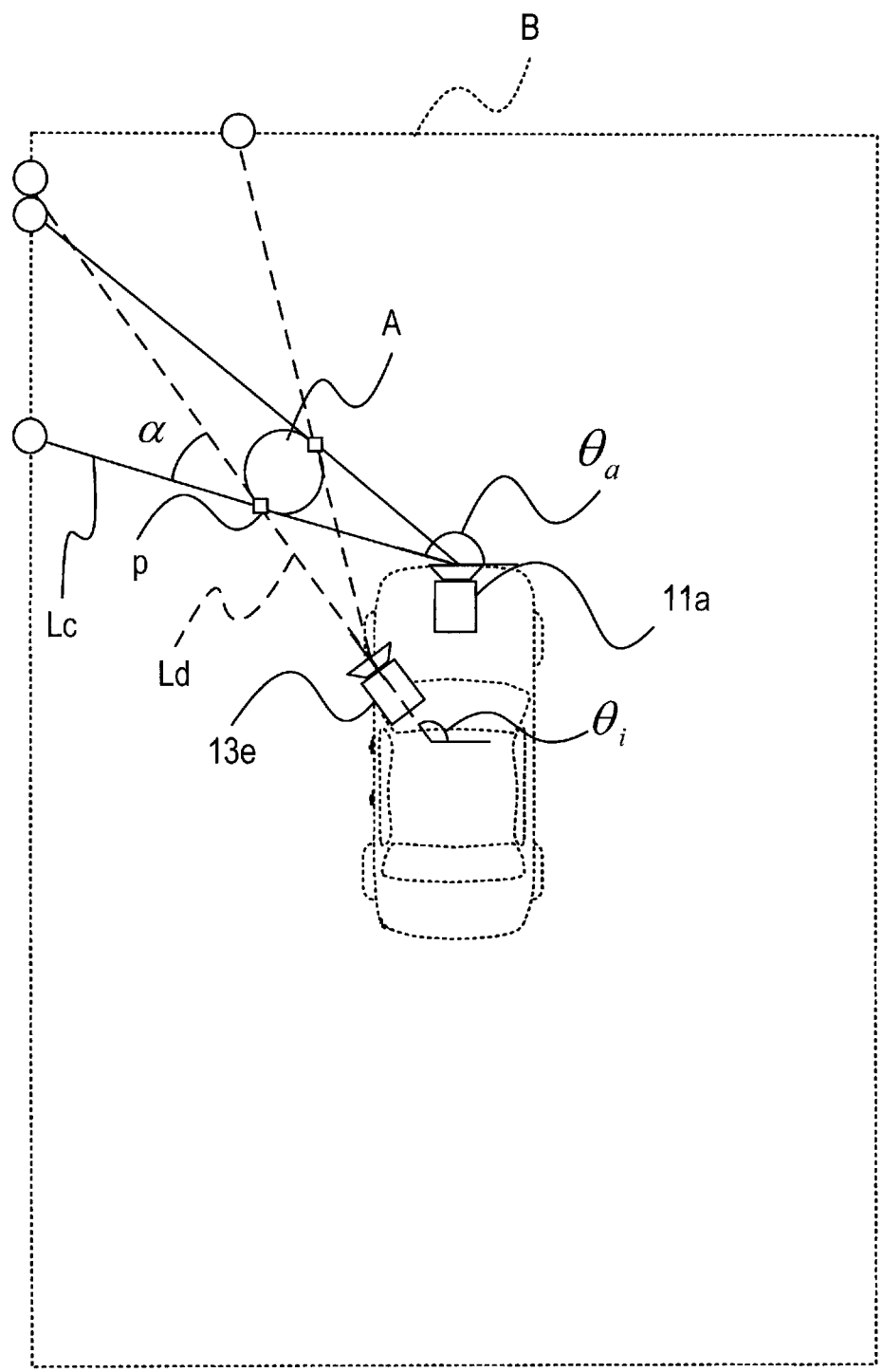
FIG. 11 is a view of conversion from an overhead image of a front camera into a virtual overhead image in a variation.
Figure 12:
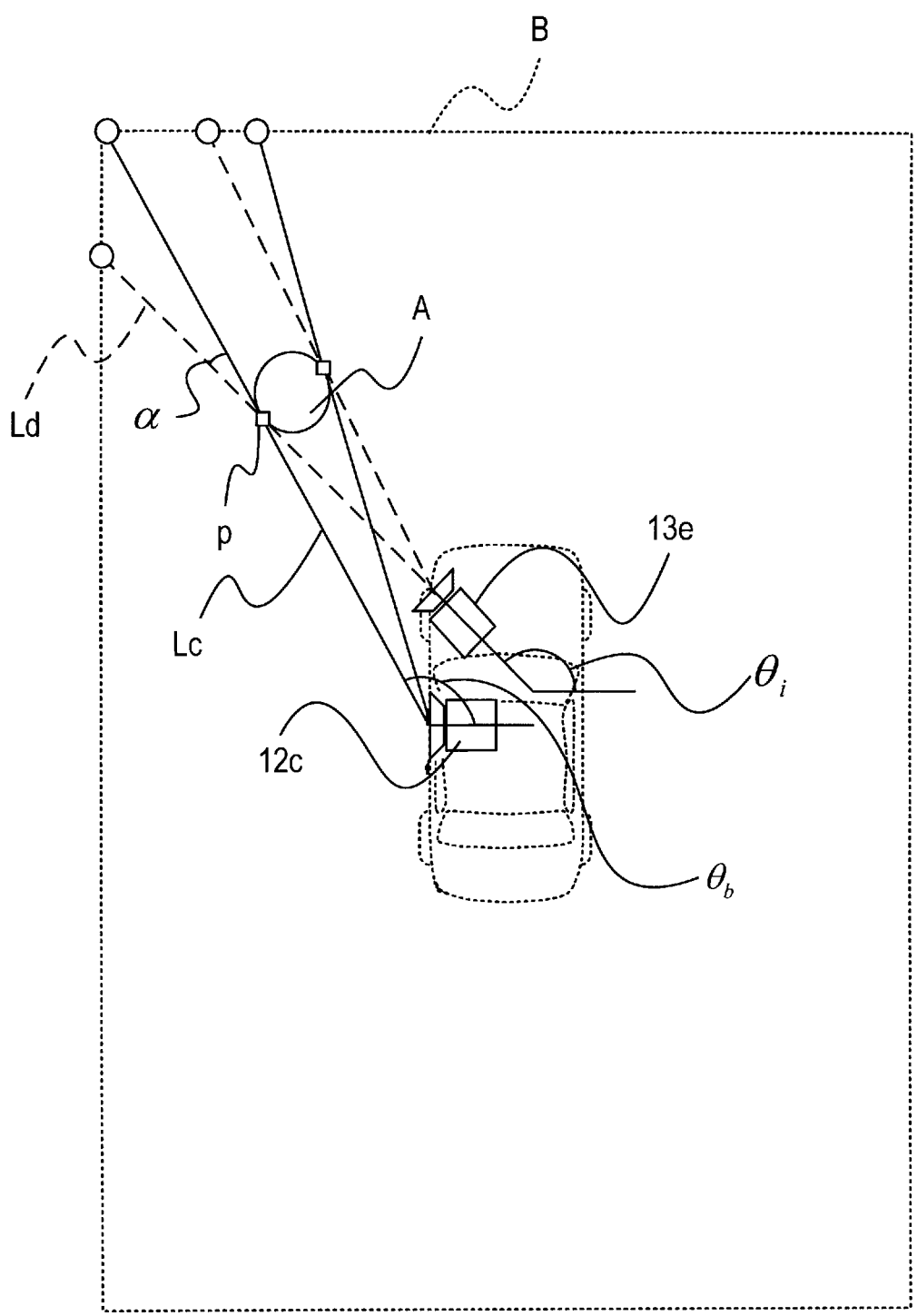
FIG. 12 is a view of conversion from an overhead image of a left camera into a virtual overhead image in the variation.

For example, the method for rotating the three-dimensional object area by coordinate conversion may be performed as follows. As illustrated in FIGS. 11 and 12, the target line La passing through a boundary portion as a boundary at which the three-dimensional object is present at the specific point p is taken as an outer target line Lc. Then, for each outer target line Lc, pixels of the first conversion image 105 present on the outer target line Lc present on the opposite side of the specific point p as viewed from the target camera are rotated about the specific point p by the conversion angle α calculated by the angle calculation unit. The target camera described herein is the front camera 11a or the left camera 12c.

That is, the outer target line Lc is rotated to overlap with an outer conversion line Ld as the conversion line Lb corresponding to the outer target line Lc.

Further, after rotation, a pixel value of each pixel belonging to an area sandwiched by the outer conversion lines Ld may be changed to a set pixel value. The set pixel value described herein may be a pixel value of one pixel present within the three-dimensional object area. Alternatively, the set pixel value may be the average of pixel values of multiple pixels present within the three-dimensional object area.

According to such rotation of the three-dimensional object area by coordinate conversion, the second conversion image 106 can uniformly have the same pixel value. With this configuration, the number of times rotation processing is performed can be reduced as compared to a case where the pixels belonging to the target line La for each specific point p are rotated by the conversion angle α calculated at S340 to overlap with the conversion line Lb, and unavailability of the processing can be reduced.

(2b) Further, after rotation of the outer target line Lc, the length of the outer conversion line Ld may be extended to an end B of the first conversion image 105. With this configuration, the risk of a length of the outer conversion line Ld being insufficient to reach an end of the second conversion image 106 can be reduced.

(2c) In the above-described embodiment, the position determined according to the predetermined rule in the first conversion image 105 is set as the position of the virtual camera 13e. In the above-described embodiment, the position of the left side mirror of the subject vehicle is set as the position of the virtual camera 13e, but the set position of the virtual camera is not limited to above. For example, using three-dimensional object positioning results from the positioning sensors 20a to 20d, a position at which a distance to the three-dimensional object is shortest may be set as the position of the virtual camera 13e.

Moreover, in the above-described embodiment, the predetermined rule is, for example, the rule for setting the position along the outer periphery of the subject vehicle. However, the position of the virtual camera 13e set according to the predetermined rule is not limited to above. That is, a rule for setting the center of the subject vehicle as the position of the virtual camera 13e may be used, for example.

(2d) in the above-described embodiment, the specific point is extracted from the first conversion image 105 at S310 of the second creation processing, and the subsequent processing is performed. However, the image targeted for execution of the second creation processing is not limited to the first conversion image 105. For example, the specific point may be extracted from the overall overhead image 104 synthesized at S310 of the second creation processing. In this case, after execution of the second creation processing for the overall overhead image 104, conversion into the image of the area displayed on the display device 50 array be performed.

(2e) In the above-described embodiment, the image display processing is repeatedly executed in a case where the shift lever is set to the position of "R", but the timing of displaying the image display processing is not limited to above. For example, the subject vehicle may include a button operable by the driver, and the image display processing may be executed in a case where the driver performs predetermined operation for the image creation device, such as a case where such a button has been pressed.

(2f) Multiple functions of a single component in the above-described embodiment may be implemented by multiple components, and a single function of a single component may be implemented by multiple components. Moreover, multiple functions of multiple components may be implemented by a single component, and a single function implemented by multiple components may be implemented by a single component. Further, some of the configurations of the above-described embodiment may be omitted. In addition, at least some of the configurations of the above-described embodiment may be added to or replaced with the configurations of the other embodiments described above. Note that any aspects included in the technical idea specified from phrasing in the claims are embodiments of the present disclosure.

(2g) The present disclosure is not limited to the above-described image creation device. For example, the present disclosure can be implemented in various forms such as a system including the image creation device as a component, a program for causing a computer to function as the image creation device, a non-transitory tangible recording medium such as a semiconductor memory storing such a program, and an image creation method.

What is claimed is:

1. An image creation device mounted on a vehicle, comprising:
    an image acquisition unit configured to acquire multiple captured images as images captured by multiple image capturing devices configured to capture an image of a peripheral area as a predetermined area of a periphery of the vehicle;
    a detection unit configured to detect a three-dimensional object present in the peripheral area;
    a first conversion unit configured to convert the multiple captured images acquired by the image acquisition unit into multiple individual overhead images indicating the vehicle from a point of view overlooking the vehicle according to a preset conversion rule, thereby creating a first conversion image by means of an overall overhead image obtained by synthesis of the multiple individual overhead images;

a second conversion unit configured to create a second conversion image in which an image captured from a virtual camera is converted in accordance with the conversion rule, the virtual camera being virtually arranged at a virtual position set on the vehicle such that a virtual optical axis direction faces the direction of the three-dimensional object; and a synthesis unit configured to synthesize the second conversion image on the first conversion image to create a synthesis image, wherein the second conversion unit includes an angle calculation unit configured to define an area where the three-dimensional object is shown in the first conversion image to be a three-dimensional object area, define one of the image capturing devices having captured an image of the three-dimensional object to be a target camera, define a virtual line passing through a position of the target camera and a specific point as a point at which the three-dimensional object has been detected in the first conversion image to be a target line, and obtain a conversion angle as an angle between a direction of the specific point with respect to the target camera and a direction of the specific point with respect to the virtual camera, and a conversion execution unit configured to define the target line passing through a boundary portion as a boundary at which the three-dimensional object is present at the specific point to be an outer target line, and perform, for the outer target line, at least coordinate conversion for rotating a pixel of the first conversion image on the outer target line present on an opposite side of the specific point as viewed from the target camera about the specific point by the conversion angle calculated by the angle calculation unit, thereby generating the second conversion image.

2. The image creation device according to claim 1, wherein the conversion execution unit is configured to execute, for all specific points belonging to the three-dimensional object area, the coordinate conversion for each specific point.

3. The image creation device according to claim 1, wherein the conversion execution unit is configured to change a pixel value, which is obtained by the coordinate conversion of the outer target line, of the pixel positioned at a portion sandwiched by boundary portions of the three-dimensional object in the second conversion image to a set pixel value, the set pixel value being one of a pixel value of one pixel present within the three-dimensional object area or an average of pixel values of multiple pixels present within the three-dimensional object area, thereby performing conversion into the second conversion image.

4. The image creation device according to claim 1, wherein the second conversion unit is configured to define a center of the vehicle in the first conversion image to be the virtual position.

5. The image creation device according to claim 1, wherein the second conversion unit is configured to define, as the virtual position, a position at which a distance to the three-dimensional object is shortest on the vehicle in the first conversion image.

6. The image creation device according to claim 1, further comprising:

a history storing unit configured to save the first conversion image created by the first conversion unit;

a behavior acquisition unit configured to acquire behavior of the vehicle from a point of time of storing in the history storing unit; and a history image creation unit configured to create a history image as an image obtained in such a manner that the first conversion image saved by the history storing unit is coordinate-converted such that a displayed indication in the image is moved in a direction opposite to the behavior of the vehicle measured by the behavior acquisition unit, wherein the synthesis unit is configured to synthesize the history image, the first conversion image, and the second conversion image to create the synthesis image.

7. A computer-implemented method for creating an overhead image from a captured image of a periphery of a vehicle, the computer-implemented method comprising:

acquiring multiple captured images as images captured by multiple image capturing devices configured to capture an image of a peripheral area as a predetermined area of the periphery of the vehicle;

detecting a three-dimensional object present in the peripheral area;

converting the multiple captured images acquired into multiple individual overhead images indicating the vehicle from a point of view overlooking the vehicle according to a preset conversion rule, thereby creating a first conversion image by means of an overall overhead image obtained by synthesis of the multiple individual overhead images;

creating a second conversion image in which an image captured from a virtual camera is converted in accordance with the conversion rule, the virtual camera being virtually arranged at a virtual position set on the vehicle such that a virtual optical axis direction faces the direction of the three-dimensional object; and synthesizing the second conversion image on the first conversion image to create a synthesis image, wherein creating a second conversion image includes defining an area where the three-dimensional object is shown in the first conversion image to be a three-dimensional object area, defining one of the image capturing devices having captured an image of the three-dimensional object to be a target camera, defining a virtual line passing through a position of the target camera and a specific point as a point at which the three-dimensional object has been detected in the first conversion image to be a target line, obtaining a conversion angle as an angle between a direction of the specific point with respect to the target camera and a direction of the specific point with respect to the virtual camera, defining the target line passing through a boundary portion as a boundary at which the three-dimensional object is present at the specific point to be an outer target line, and performing, for the outer target line, at least coordinate conversion for rotating a pixel of the first conversion image on the outer target line present on an opposite side of the specific point as viewed from the target camera about the specific point by the conversion angle calculated, thereby generating the second conversion image.

* * * * *